United States Patent
Rao

(10) Patent No.: US 9,525,903 B2
(45) Date of Patent: Dec. 20, 2016

(54) METHOD AND SYSTEM FOR SKIPPING OPTIMUM ADVERTISEMENTS IN CONTENT

(71) Applicant: Sanjeev Madhava Rao, Manhattan Beach, CA (US)

(72) Inventor: Sanjeev Madhava Rao, Manhattan Beach, CA (US)

(*) Notice: Subject to any disclaimer, the term of this patent is extended or adjusted under 35 U.S.C. 154(b) by 1 day.

(21) Appl. No.: 14/587,216

(22) Filed: Dec. 31, 2014

(65) Prior Publication Data

US 2016/0191972 A1    Jun. 30, 2016

(51) Int. Cl.

| | |
|---|---|
| *H04N 21/2668* | (2011.01) |
| *H04N 21/258* | (2011.01) |
| *H04N 21/262* | (2011.01) |
| *H04N 21/81* | (2011.01) |
| *H04N 21/6587* | (2011.01) |
| *H04N 21/2547* | (2011.01) |
| *H04N 21/2387* | (2011.01) |
| *G06Q 30/00* | (2012.01) |

(52) U.S. Cl.
CPC .......... *H04N 21/2668* (2013.01); *G06Q 30/00* (2013.01); *H04N 21/2387* (2013.01); *H04N 21/2547* (2013.01); *H04N 21/25891* (2013.01); *H04N 21/26225* (2013.01); *H04N 21/6587* (2013.01); *H04N 21/812* (2013.01)

(58) Field of Classification Search
CPC ............ H04N 21/2387; H04N 21/6587; H04N 21/2668; H04N 21/25891; H04N 21/26225; H04N 21/812; H04N 21/2547; G06Q 30/00

See application file for complete search history.

(56) References Cited

U.S. PATENT DOCUMENTS

| | | | |
|---|---|---|---|
| 2013/0198013 A1* | 8/2013 | Shehan ................ | G06Q 30/02 705/14.73 |
| 2014/0358697 A1* | 12/2014 | Irwin ................. | G06Q 30/0275 705/14.71 |

* cited by examiner

*Primary Examiner* — Benjamin R Bruckart
*Assistant Examiner* — Akshay Doshi
(74) *Attorney, Agent, or Firm* — Kolisch Hartwell, P.C.

(57) ABSTRACT

The present disclosure provides a method and system for skipping one or more advertisements at a corresponding one or more advertisement slots in a content viewed by a user of one or more users. The method includes receiving a first amount from the user, choosing a first set of advertisement slots of the one or more advertisement slots, determining a corresponding threshold third pre-determined amount separately for each of the first set of advertisement slots for bidding and bidding a corresponding fourth pre-determined amount for each of the first set of advertisement slots. The first amount is set for skipping optimum number of the one or more advertisements at the corresponding one or more advertisement slots. The choosing is based on a second amount for each of the one or more advertisement slots, the first amount and a first pre-defined criterion.

20 Claims, 7 Drawing Sheets

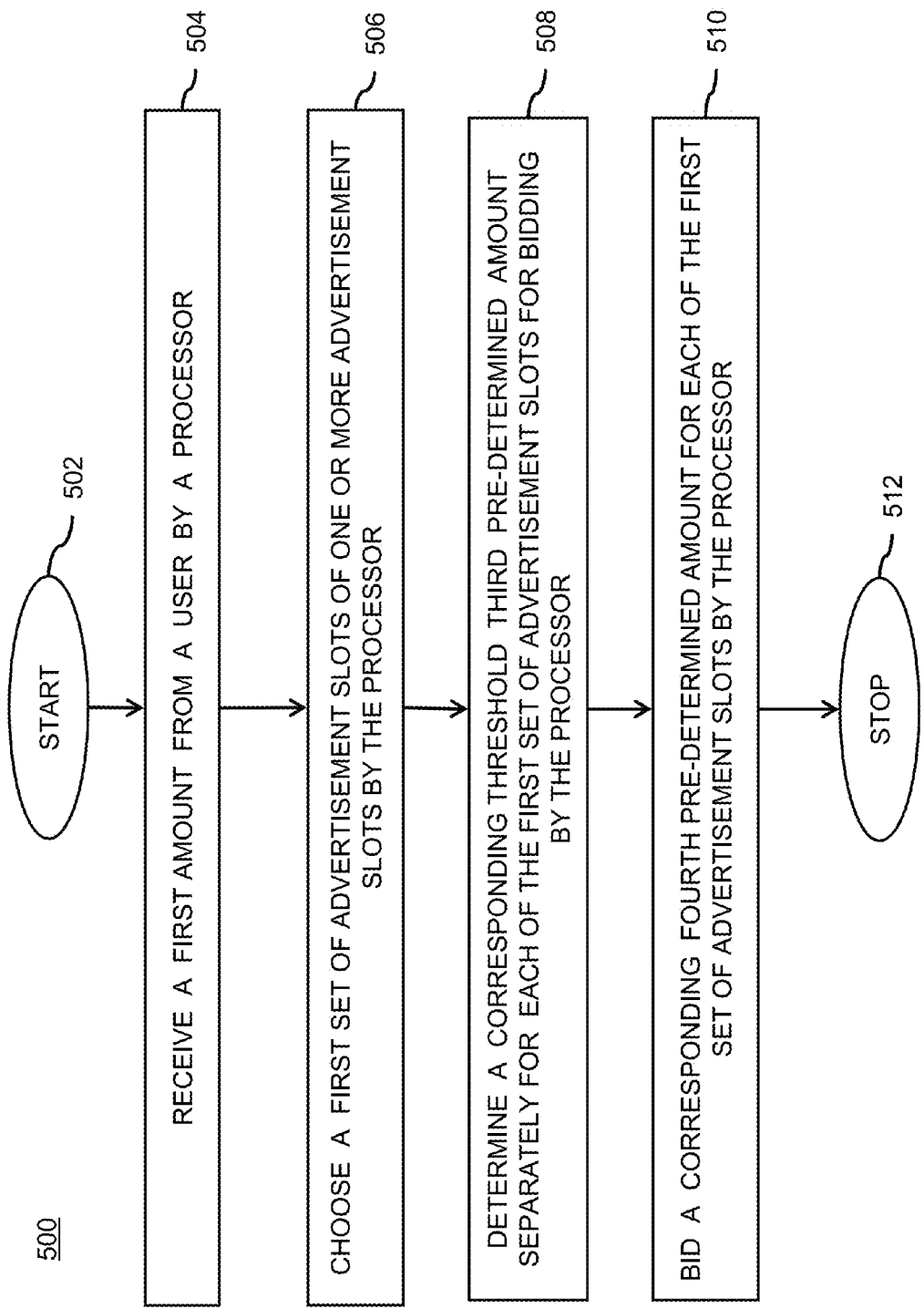

METHOD AND SYSTEM FOR SKIPPING OPTIMUM ADVERTISEMENTS IN CONTENT

TECHNICAL FIELD

The present invention relates to the field of advertising and, in particular, relates to skipping of optimum number of advertisements in content.

BACKGROUND

Advertising is an ever evolving industry which functions on a fact of survival of the fittest. Nowadays more and more consumers are showing significant interest in viewing advertisements. The advertisements serve as a medium for the consumers to explore the various online and offline services. Many publishers have started displaying advertisements in content. Advertisements are displayed to the consumers through various formats such as video, audio, text and the like. Further, the advertisements are displayed in both online and offline mode.

However, the advertisements shown in the content irritates a user. The user gets interrupted every time when the advertisements are encountered in viewing of the content. Further, nobody has time to watch the advertisements that do not suit his/her interests. For example, a male user while watching a video on a video viewing and networking platform encounters an advertisement regarding female products. The advertisement does not suit his interest and may annoy him. This is a big concern for publishers in terms of their marketing strategy.

In the present scenario, some publishers provide a direct option to the user for skipping the advertisements by just simply clicking on the skip advertisement button. This is the easiest way of skipping the advertisements. Further, some systems provide the user an option of blocking the advertisements through various advertisement blocking softwares when the user is viewing the advertisements online. In addition, some current methods allow the users to skip the advertisements by paying a sum of money to the publisher.

In an example, a US Patent Application US 20130198013 A1 provides systems and methods for an electronic brokerage allowing consumer-initiated payment to skip electronic advertisements at publisher electronic content interfaces. According to one embodiment of this patent application, an electronic brokerage is designed to allow paid, consumer-initiated advertisement skipping, which involves providing secured electronic client code and processes that are placed on publisher electronic content interfaces that execute within consumer browsers to allow consumers to choose whether they wish to pay to skip specific electronic advertising opportunities. These electronic brokerage systems allow publishers and consumers to securely register accounts with the brokerage that are used, respectively, to provide non-repudiated electronic advertising opportunity attestation and explicit consent/dissent to pay to skip those advertising opportunities.

As stated above, the present systems and methods which allow the users to provide a budget for skipping the advertisements in the advertisement slots have a lot of constraints and restrictions. However, the present systems and methods results in the spending of a large part of the budget for skipping a single advertisement slot or initial few advertisement slots in a content, thereby ignoring the other advertisement slots. In addition, the present systems and methods do not provision the user to bid on maximum number of advertisement slots in content for skipping. This inability leads to the user viewing a lot of advertisements despite allocating a lot of money for advertisement skipping, thereby making the advertisement skipping system inefficient.

In the light of the above stated discussion, there is a need for a method and system that overcomes the above stated disadvantages.

SUMMARY

In an aspect of the present disclosure, a computer-implemented method for skipping one or more advertisements at a corresponding one or more advertisement slots in a content viewed by a user of one or more users is provided. The computer-implemented method includes receiving, with a processor, a first amount from the user; choosing, with the processor, a first set of advertisement slots of the one or more advertisement slots; determining, with the processor, a corresponding threshold third pre-determined amount separately for each of the first set of advertisement slots for bidding and bidding, with the processor, a corresponding fourth pre-determined amount for each of the first set of advertisement slots. The first amount is set for skipping optimum number of the one or more advertisements at the corresponding one or more advertisement slots. The choosing is based on a second amount for each of the one or more advertisement slots, the first amount and a first pre-defined criterion. The third pre-determined amount is less than the first amount and is based on a second pre-determined criterion. The corresponding fourth pre-determined amount for each of the first set of advertisement slots is an amount greater than the amount if the user opted for viewing the one or more advertisements in the corresponding one or more advertisement slots and the corresponding fourth pre-determined amount is less than the corresponding threshold third pre-determined amount.

In an embodiment of the present disclosure, the first pre-defined criterion includes a pre-defined value. The pre-defined value is based on one or more pre-defined factors.

In another embodiment of the present disclosure, the one or more pre-defined factors includes at least one of interaction of the user with the one or more advertisements, advertisement skipping history of the user, total remaining budget of the user, mindset of the user, budget refill policy, frequency of repetitive advertisements, frequency of undesirable advertisements, budget spent history and time spent in a session.

In yet another embodiment of the present disclosure, the bidding of the corresponding fourth pre-determined amount is based on a real time bidding auction.

In yet another embodiment of the present disclosure, the second amount corresponds to bidding history of the one or more advertisement slots.

In yet another embodiment of the present disclosure, the method further includes maintaining information of the one or more users, the first amount, the second amount, the third pre-determined amount, the fourth pre-determined amount and the one or more pre-defined factors.

In yet another embodiment of the present disclosure, the content includes at least one of online and offline content, text content, flash content and HTML content.

In another aspect of the present disclosure, a computer system is provided. The computer system includes a non-transitory computer readable medium storing a computer readable program; the computer readable program when executed on a computer causes the computer to perform steps. The steps include receiving a first amount from user, choosing a first set of advertisement slots of one or more advertisement slots, determining a corresponding threshold third pre-determined amount separately for each of the first set of advertisement slots for bidding and bidding a corresponding fourth pre-determined amount for each of the first set of advertisement slots. The first amount is set for skipping optimum number of one or more advertisements at the corresponding one or more advertisement slots in a content. The choosing is based on a second amount for each of the one or more advertisement slots, the first amount and a first pre-defined criterion. The third pre-determined amount is less than the first amount and is based on a second pre-determined criterion. The corresponding fourth pre-determined amount for each of the first set of advertisement slots is an amount greater than the amount if the user opted for viewing the one or more advertisements in the corresponding one or more advertisement slots and the corresponding fourth pre-determined amount is less than the corresponding threshold third pre-determined amount.

In an embodiment of the present disclosure, the first pre-defined criterion includes a pre-defined value. The pre-defined value is based on one or more pre-defined factors. In another embodiment of the present disclosure, the pre-defined factors includes at least one of interaction of the user with the one or more advertisements, advertisement skipping history of the user, total remaining budget of the user, mindset of the user, budget refill policy, frequency of repetitive advertisements, frequency of undesirable advertisements, budget spent history and time spent in a session.

In yet another embodiment of the present disclosure, the computer readable program when executed on the computer causes the computer to perform a further step of maintaining information of the one or more users, the first amount, the second amount, the third pre-determined amount, the fourth pre-determined amount and the one or more pre-defined factors.

In yet another embodiment of the present disclosure, the bidding of the corresponding fourth pre-determined amount is based on a real time bidding auction. In yet another embodiment of the present disclosure, the second amount corresponds to bidding history of the one or more advertisement slots.

In yet another aspect of the present disclosure, a system for skipping one or more advertisements at a corresponding one or more advertisement slots in a content viewed by a user of one or more users is provided. The system includes a receiving module in a processor configured to receive a first amount from the user, a selection module in the processor configured to choose a first set of advertisement slots of the one or more advertisement slots, a determination module in the processor configured to determine a corresponding threshold third pre-determined amount separately for each of the first set of advertisement slots for bidding and a bidding module in the processor configured to bid a corresponding fourth pre-determined amount for each of the first set of advertisement slots. The first amount is set for skipping optimum number of the one or more advertisements at the corresponding one or more advertisement slots. The choosing is based on a second amount for each of the one or more advertisement slots, the first amount and a first pre-defined criterion. The third pre-determined amount is less than the first amount and is based on a second pre-determined criterion. The corresponding fourth pre-determined amount for each of the first set of advertisement slots is an amount greater than the amount if the user opted for viewing the one or more advertisements in the corresponding one or more advertisement slots. The corresponding fourth pre-determined amount is less than the corresponding threshold third pre-determined amount.

In an embodiment of the present disclosure, the first pre-defined criterion includes a pre-defined value. The pre-defined value is based on one or more pre-defined factors. In another embodiment of the present disclosure, the pre-defined factors includes at least one of interaction of the user with the one or more advertisements, advertisement skipping history of the user, total remaining budget of the user, mindset of the user, budget refill policy, frequency of repetitive advertisements, frequency of undesirable advertisements, budget spent history and time spent in a session. In yet another embodiment of the present disclosure, the bidding of the corresponding fourth pre-determined amount is based on a real time bidding auction.

In yet another embodiment of the present disclosure, the second amount corresponds to bidding history of the one or more advertisement slots. In yet another embodiment of the present disclosure, the system further includes a database in the processor configured to maintain a database of the one or more users, the first amount, the second amount, the third pre-determined amount, the fourth pre-determined amount and the one or more pre-defined factors.

In yet another embodiment of the present disclosure, the content includes at least one of online and offline content, text content, flash content and HTML content.

BRIEF DESCRIPTION OF THE FIGURES

Figure 1:
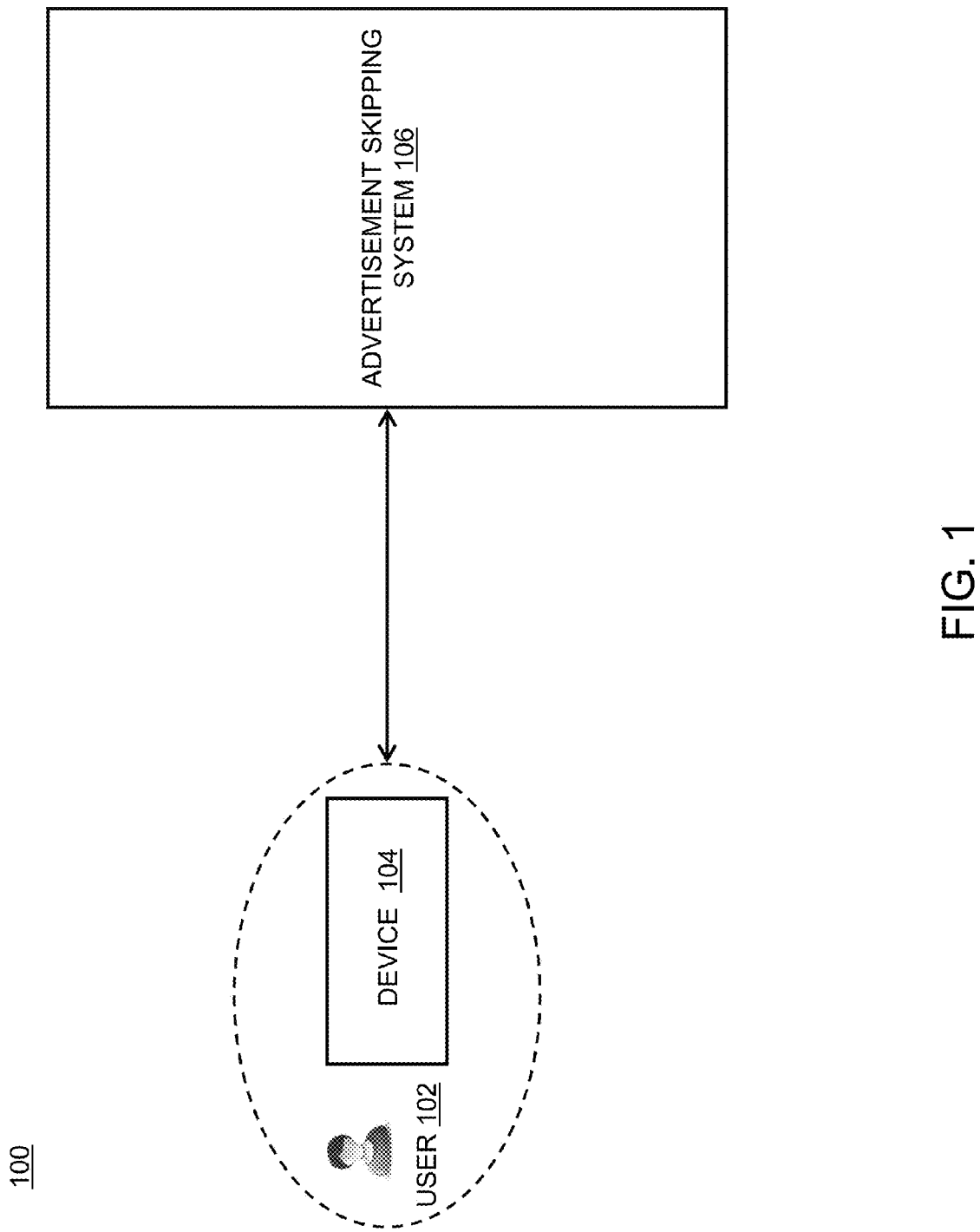
Figure 2A:
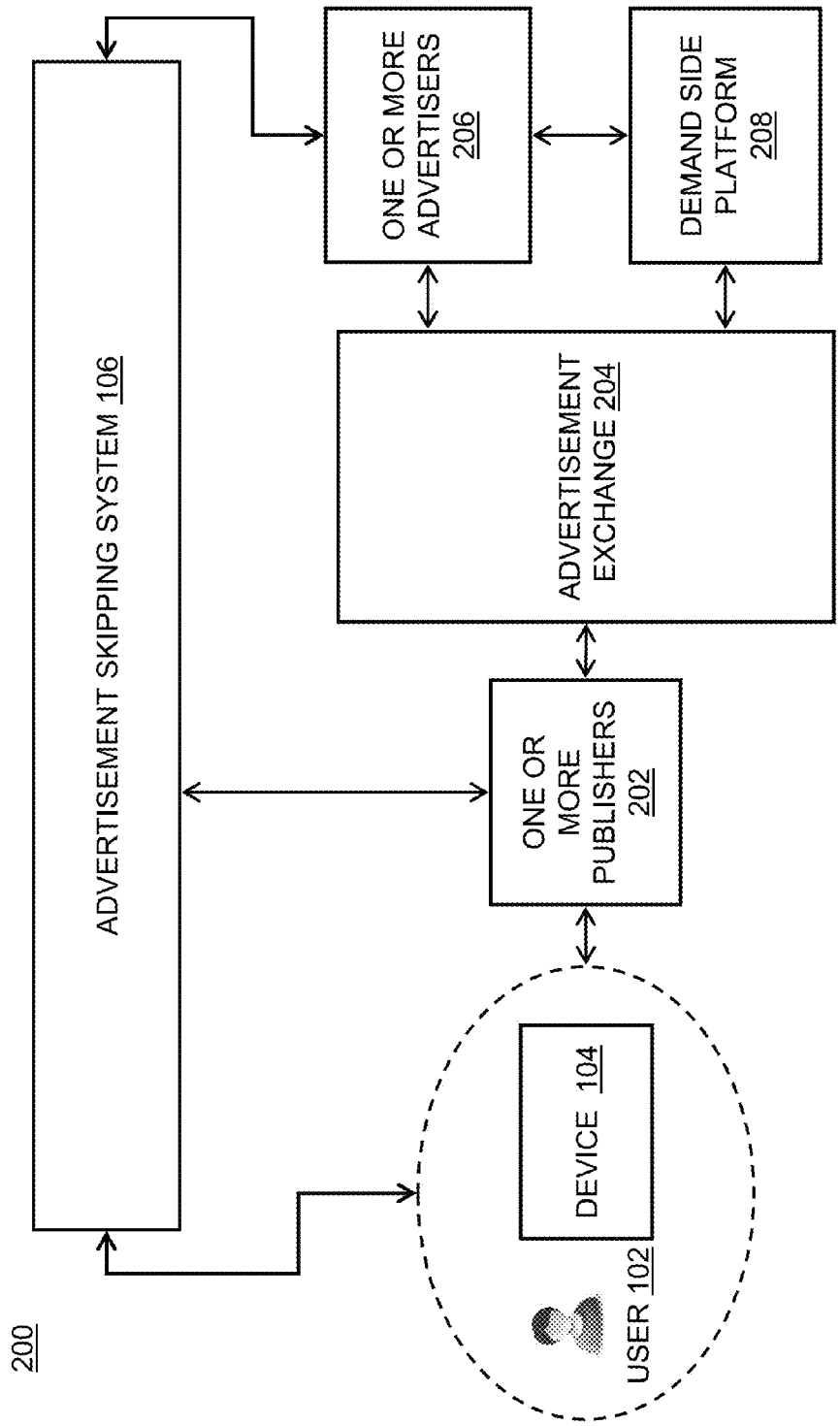
Figure 2B:
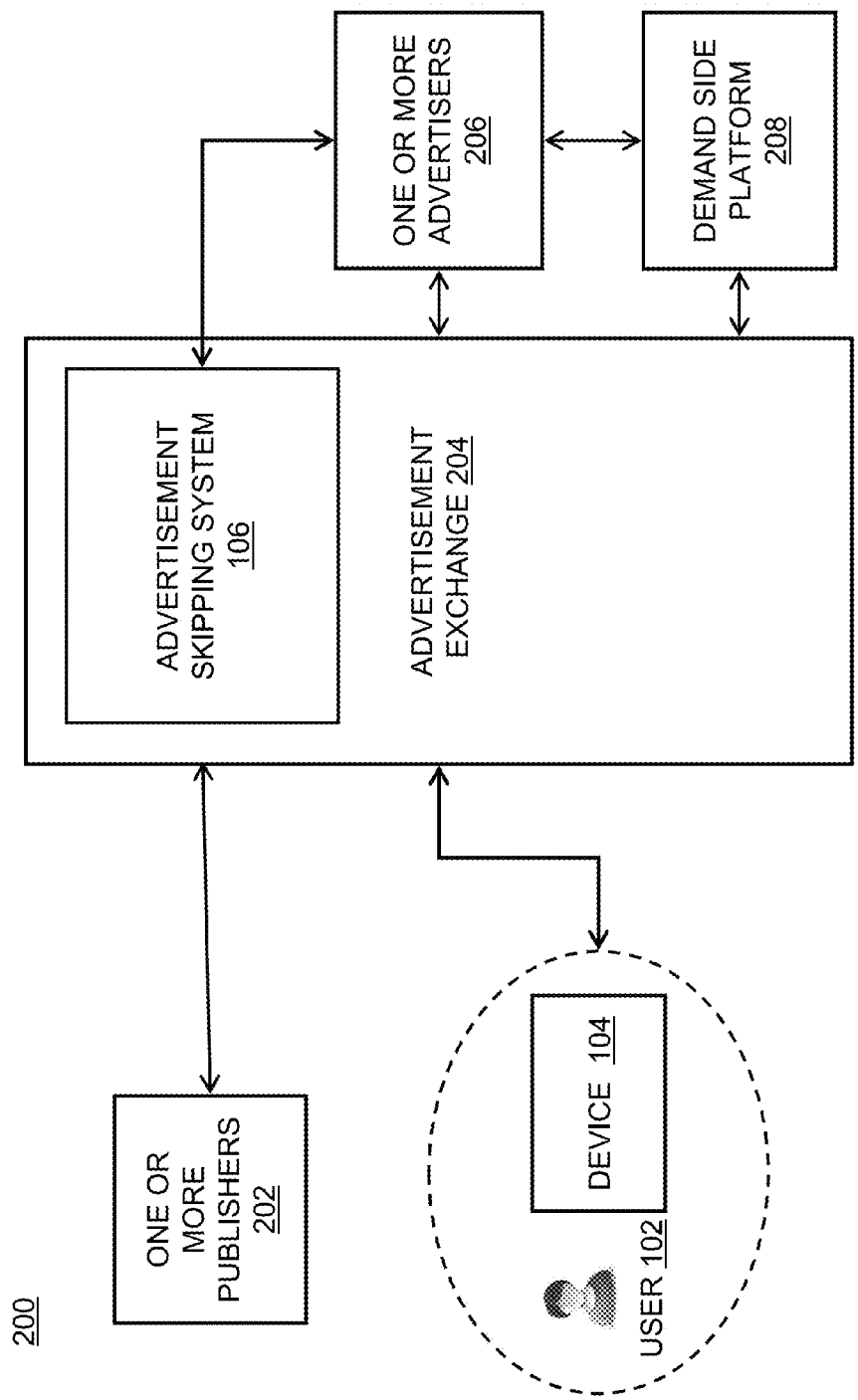
Figure 3A:
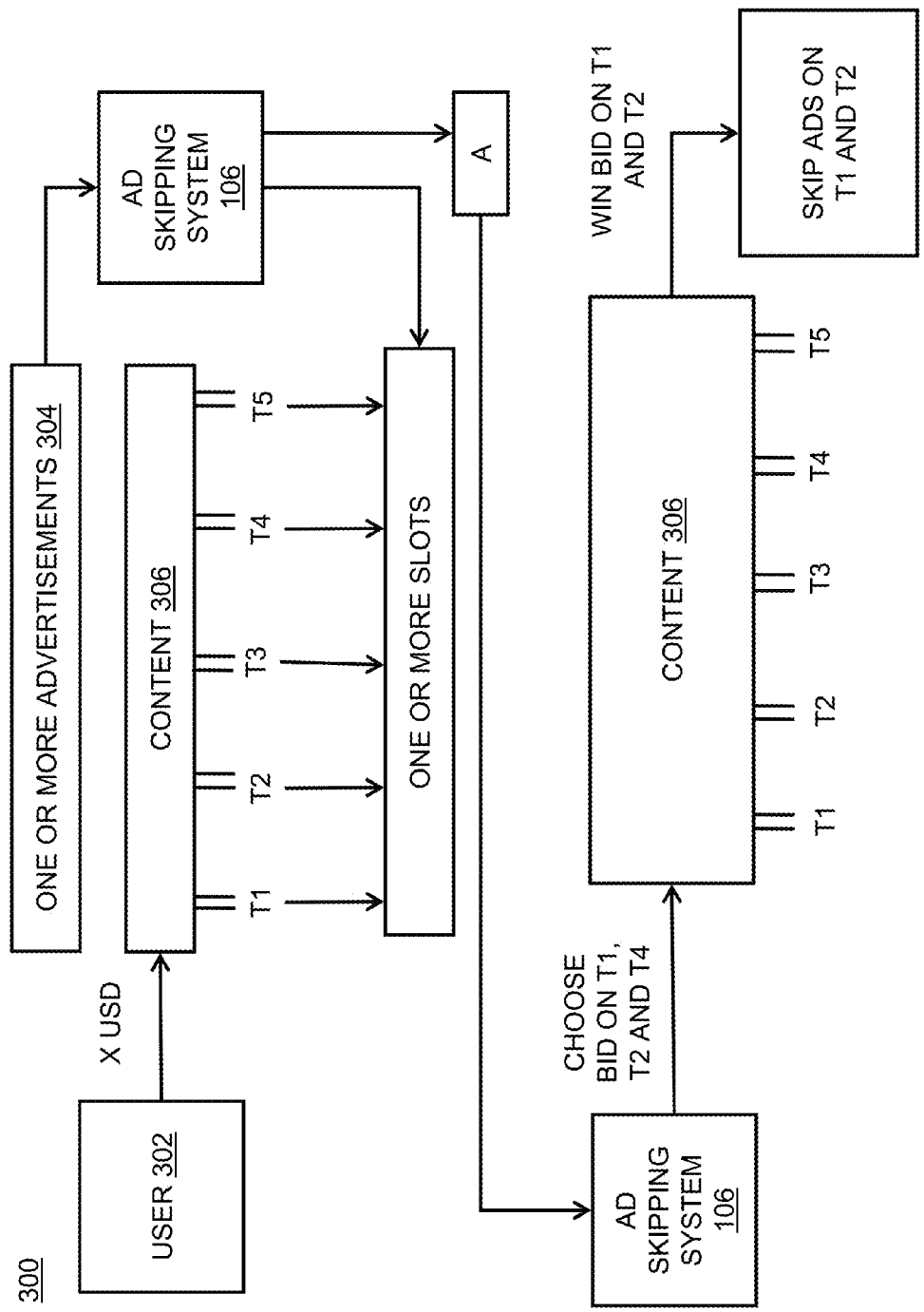
Figure 3B:
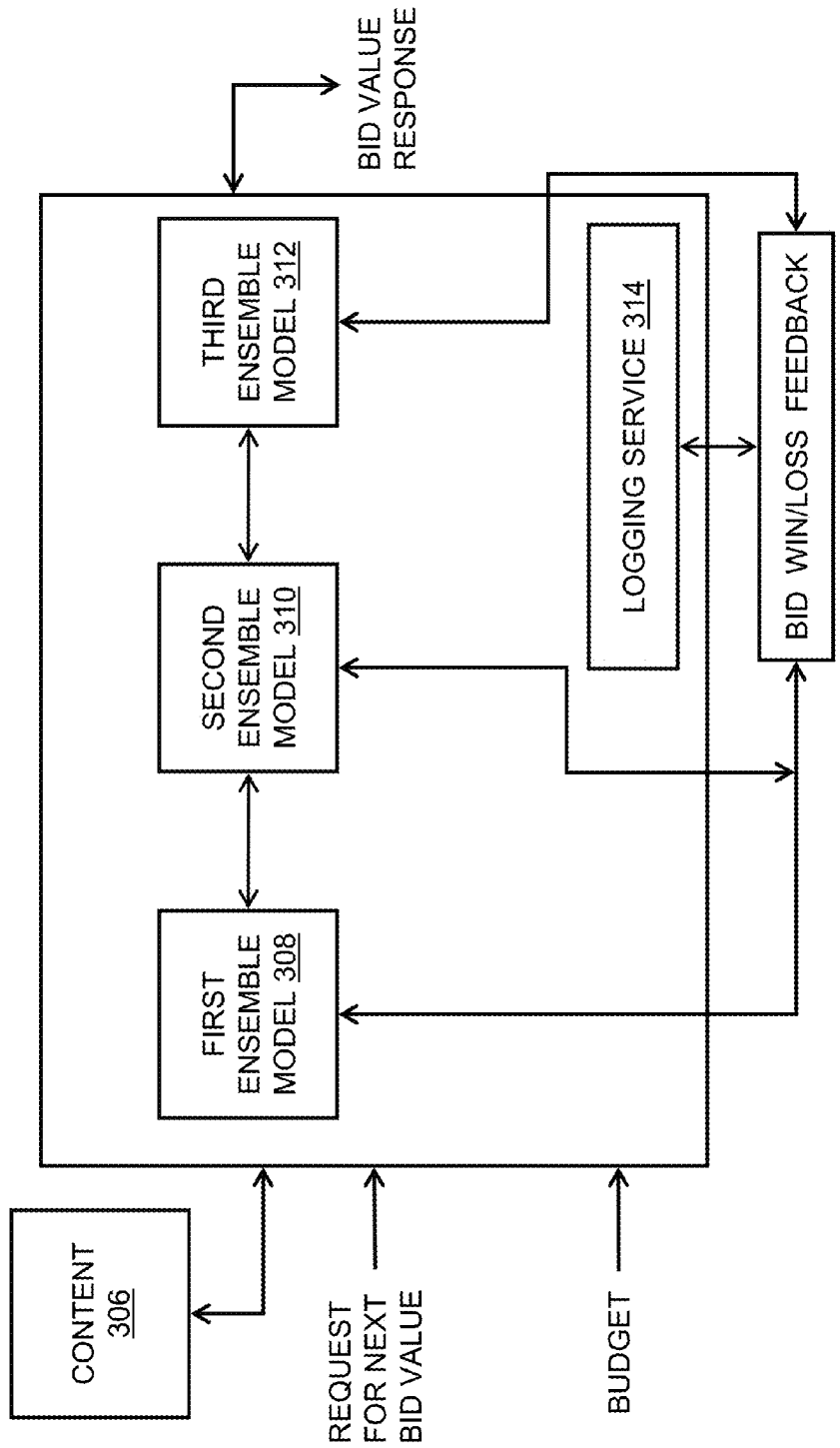
Figure 4:
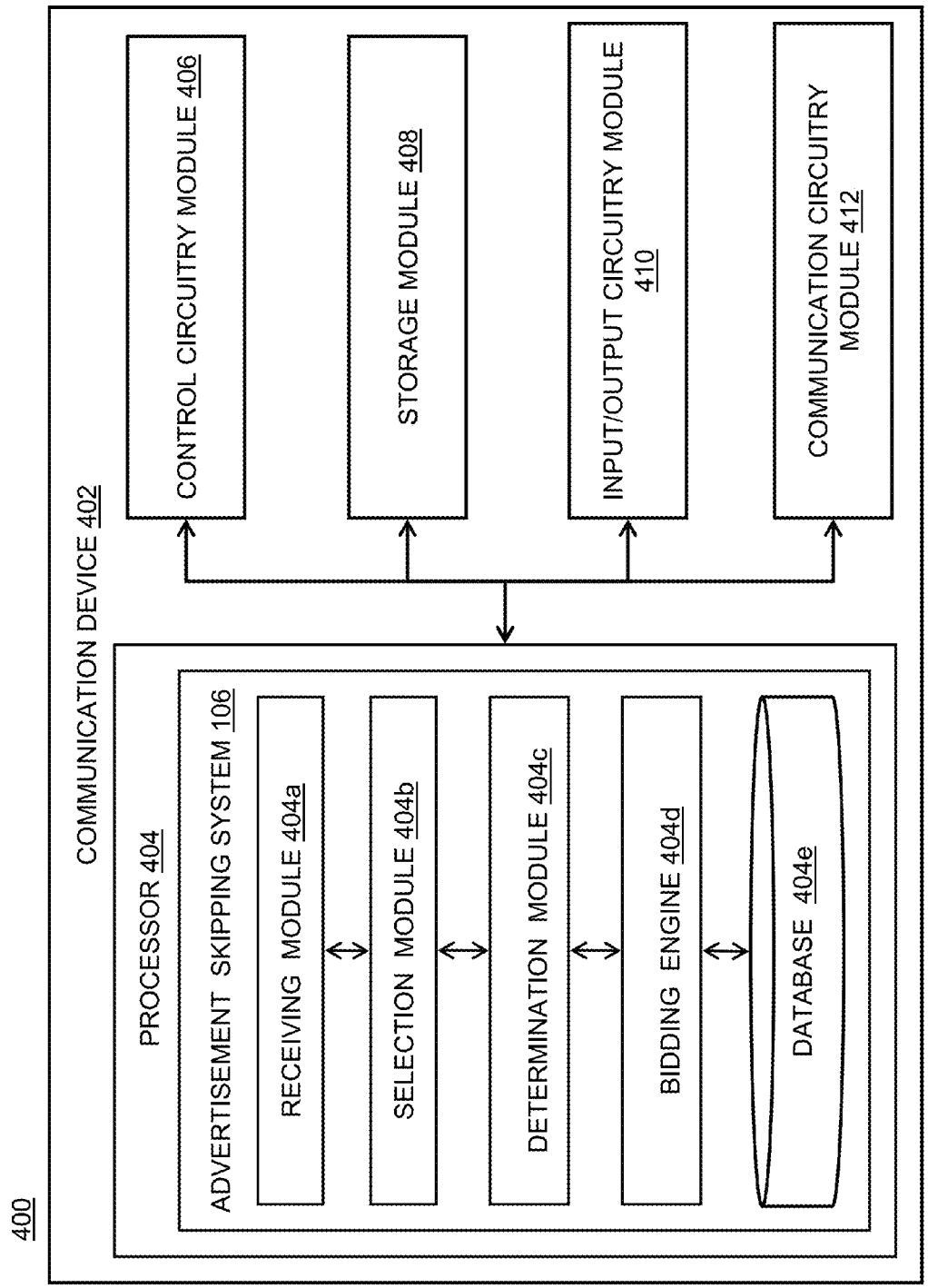

Having thus described the invention in general terms, reference will now be made to the accompanying drawings, which are not necessarily drawn to scale, and wherein:

FIG. 1 illustrates a general overview of a system for skipping one or more advertisements, in accordance with various embodiments of the present disclosure;

FIG. 2A and FIG. 2B illustrate a system for skipping the one or more advertisements at the corresponding one or more advertisement slots in the content, in accordance with various embodiments of the present disclosure;

FIG. 3A and FIG. 3B illustrates a system for showing an example embodiment for skipping the one or more advertisements, in accordance with various embodiments of the present disclosure;

FIG. 4 illustrates a block diagram of a communication device, in accordance with various embodiments of the present disclosure.

FIG. 5 illustrates a flowchart for skipping the one or more advertisements, in accordance with various embodiments of the present disclosure; and

DETAILED DESCRIPTION

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

FIG. 1 illustrates a general overview of a system 100 for skipping one or more advertisements at a corresponding one or more advertisement slots in a content, in accordance with various embodiments of the present disclosure. The system 100 includes a device 104 associated with a user 102 and an advertisement skipping system 106. The user 102 may be any individual or a person accessing the device 104. Examples of the device 104 include but may not be limited to laptops, mobile phones, computers, tablets, a television set and a personal digital assistant (PDA). The device 104 may be connected to an internet broadband system, a local area network, a wide area network, a cable television digital network, a cable television analog network or any other network/technology presently known in the art which allow the content to be viewed on the device 104.

The user 102 watches a content of one or more contents on the device 104. The content may be an online content or offline content, live or delayed, video on demand, packaged as streaming and the like. Further, the content may take a form of mobile applications and games providing display of the one or more advertisements. Moreover, the content include but not be limited to an audio content, a video content, a flash content, text content and HTML content. Further, the user 102 views the content on the device 104 according to his/her specific interests. The user 102 may be interested in watching videos related to sports, movies or any recreational activity, listening songs, visiting social networking sites, watching news on television, playing games on mobile phone or any other content according to the choice of the user 102. For example, a user X watches a video of a cricket match on his/her laptop, a user Y watches a popular TV show on his/her television and a user Z plays a combat game on his/her mobile phone.

The user 102 encounters the one or more advertisements at different advertisement time slots while watching the content on the device 104. Further, one or more publishers provide the one or more advertisements to the user 102. Examples of the one or more publishers may include but not be limited to youtube, dailymotion, facebook, news channels, movie channels, mobile applications and the like. The one or more advertisements include audio advertisements, video advertisements, textual advertisements, flash advertisements, rich media advertisements (For example, HTML advertisement) and the like. Further, an advertisement from the one or more advertisements may be in a form of a short survey poll for promotion. Continuing with the above stated example, the user X watches an advertisement of a laptop brand and a shoe brand while watching the cricket match on his/her laptop, the user Y watches an advertisement of a new mobile phone and an apparel brand while watching the TV show on his/her television and the user Z watches an advertisement of a new game and a gaming accessory while playing the combat game on his/her mobile phone.

Further, the user 102 is associated with the advertisement skipping system 106. In an embodiment of the present disclosure, the user 102 is associated with the advertisement skipping system 106 through the device 104. The advertisement skipping system 106 enables the skipping of the one or more advertisements in the corresponding one or more advertisement slots in the content viewed by the user 102. In an embodiment of the present disclosure, the advertisement skipping system 106 provides the user 102 with a provision of skipping the one or more advertisements encountered while watching the content on the device 104. The user 102 is registered on the advertisement skipping system 106 and is authorized for skipping the one or more advertisements.

Extending the above stated example, the user X watches the advertisement of the laptop brand in an advertisement slot S1 and the advertisement of the shoe brand in the advertisement slot S2, the user Y watches the advertisement of the new mobile phone in an advertisement slot T1 and the advertisement of the apparel brand in the advertisement slot T2 and the user Z watches the advertisement of the new game in an advertisement slot U1 and the advertisement of the gaming accessory in an advertisement slot U2.

Moreover, the one or more advertisements are provided based on a real time bidding process. In an embodiment of the present disclosure, the advertisement skipping system 106 skips the one or more advertisements in real time.

It may be noted that in FIG. 1, the user 102 is associated with the device 104 for viewing the content; however those skilled in the art would appreciate that more users are associated with more devices for viewing the content. For example, a user A, a user B and a user C are associated with a device D1, a device D2 and a device D3. It may also be noted that in FIG. 1, the advertisement skipping system 106 provisions the user 102 to skip the one or more advertisements; however those skilled in the art would appreciate that the advertisement skipping system 106 provisions more users to skip the one or more advertisements.

FIG. 2A illustrates a system 200 for skipping the one or more advertisements at the corresponding one or more advertisement slots in the content, in accordance with various embodiments of the present disclosure. The content maybe viewed by the user 102 on the device 104. It may be noted that to explain the system elements of FIG. 2A, references will be made to the system elements of FIG. 1.

The system 200 depicts an interconnection of the advertisement skipping system 106 with the user 102 associated with the device 104, one or more publishers 202, an advertisement exchange 204, one or more advertisers 206 and a demand side platform 208. The user 102 accesses the content on the device 104. Each of the one or more publishers 202 provide or display online and offline content, live or delayed content, video on demand and the like to the user 102. Examples of the one or more publishers 106 include websites (facebook, google, yahoo and the like), mobile applications, television channels and the like.

The one or more publishers 202 advertise products, services or businesses to the users 102 for generating revenue. In an embodiment of the present disclosure, the one or more publishers 202 are associated with the one or more advertisers 206 through the advertisement exchange 204. The one or more advertisers 206 provide advertisements to the one or more publishers 202. In another embodiment of the present disclosure, the one or more publishers 202 are associated with the one or more advertisers 206 through the advertisement exchange 204.

The one or more advertisers 206 may be one or more brands, one or more manufacturers, one or more retailers, one or more service providers, one or more government agencies and the like. Further, the one or more advertisers 206 provide the one or more advertisements to convey information to one or more users, to generate a response from the one or more users, to prompt the one or more users in making a purchase or to ask the one or more users to participate in any online or offline event.

The advertisement exchange 204 provides a platform for the one or more publishers 202 and the one or more advertisers 206 for buying and selling of advertisement inventory. Examples of the advertisement exchange 204 include but may not be limited to Microsoft AdECN, Yahoo Right Media, DoubleClick, AppNexus, OpenX. In an embodiment of the present disclosure, the one or more publishers 202 and the one or more advertisers 206 deal directly without the intervention of the advertisement exchange 204.

The user 102 encounters the one or more advertisements while watching the content on the device 104. Further, the user 102 watches the one or more advertisements in the corresponding one or more advertisement slots in the content. The one or more advertisements are provided based on the real time bidding process between the one or more publishers 202 and the one or more advertisers 206. The advertisement exchange 204 facilitates the real time bidding process.

The one or more publishers 202 provide the one or more advertisement slots to the advertisement exchange 204. The demand side platform 208 decides the one or more advertisement slots the one or more advertisers 206 should buy. The price of the one or more advertisement slots is decided through the real time bidding process. The real time bidding process takes place in milliseconds before, after or in the content. The one or more publishers 202 provide their advertisement inventory to the advertisement exchange 204 which holds the real time bidding process. The demand side platform 208 bids on behalf of the one or more advertisers 206 for winning the one or more advertisement slots. Value of a bid placed by the demand side platform 208 for the one or more advertisers 206 is determined by the buying parameters set by the one or more advertisers 206. The real time bidding process terminates many advertisers from the one or more advertisers 206 as an advertiser with a highest bid is declared the winner of a particular advertisement slot from the one or more advertisement slots and allowed to show his or her advertisement in the particular advertisement slot on a publisher of the one or more publishers 202.

For example, a user A watches an advertisement in advertisement slots t1, t2, t3 and t4 while watching a video of a popular TV show on his/her laptop, a user B watches an advertisement in advertisement slots s1, s2, s3 and s4 while watching a movie on his/her television and a user C watches an advertisement in advertisement slots u1, u2, u3 and u4 while using a mobile application on his/her mobile phone. The creator of the popular TV show, the movie and the mobile application and publishers who host the content may give advertisers an option to put the advertisement of its products/services at different time intervals, say at the starting of the content, after a pre-defined time interval or just before a crucial/critical scene of the content, and the like.

The advertisement skipping system 106 provides the provision to the user 102 to skip the one or more advertisements in the corresponding one or more advertisement slots in the content. In an embodiment of the present disclosure, the advertisement skipping system 106 provisions the user 102 to skip optimum number of the one or more advertisements in the content.

In an embodiment of the present disclosure, the advertisement skipping system 106 receives a first amount from the user 102 for skipping the optimum number of the one or more advertisements in the corresponding one or more advertisement slots in the content. In an embodiment of the present disclosure, the user 102 sets an amount (the first amount) for skipping the optimum number of the one or more advertisements in the corresponding one or more advertisement slots. Further, the user 102 is a registered user on the advertisement skipping system 106. Continuing with the above stated example, the user A sets an amount of 5$ for skipping maximum number of the advertisements in the corresponding advertisement slots (t1, t2, t3 and t4), the user B sets an amount of 7$ for skipping maximum number of the advertisements in the corresponding advertisement slots (s1, s2, s3 and s4) and the user C sets an amount of 8$ for skipping maximum number of the advertisements in the corresponding advertisement slots (u1, u2, u3 and u4).

Moreover, the advertisement skipping system 106 chooses a first set of advertisement slots from the one or more advertisement slots. In addition, the choosing of the first set of advertisement slots from the one or more advertisement slots is based on a second amount, the received first amount and a first pre-defined criterion. Further, the second amount is a real time bidding amount corresponding to the one or more advertisement slots decided in past through the real time bidding process. In an embodiment of the present disclosure, the bidding amount corresponds to the highest bidding amount of the one or more advertisers 206 for winning each of the one or more advertisement slots. In another embodiment of the present disclosure, the advertisement skipping system 106 fetches the second amount for choosing the first set of advertisement slots. In another embodiment of the present disclosure, the second amount corresponding to the one or more advertisement slots is less than the first amount for the chosen first set of advertisement slots. In yet another embodiment of the present disclosure, the advertisement skipping system 106 chooses the first set of advertisement slots such that maximum number of the one or more advertisements in the corresponding first set of advertisement slots can be skipped.

Moreover, the first pre-defined criterion includes a pre-defined value which is calculated based on one or more pre-defined factors. Further, the one or more pre-defined factors includes frequency of repetitive advertisements, interaction of the user 102 with the one or more advertisements, advertisement skipping history of the user 102, mindset of the user 102, context of the one or more advertisements in its surrounding content, context in which the content exists, recent history of devices used and differing tolerances of one or more advertisements on the devices, remaining ad skip budget, wallet refill policy, history of ad skip spent and time remaining in a session. In addition, the pre-defined value is dynamically updated on a real time basis for the user 102.

Extending the above stated example, the bidding amount for the advertisement slots (t1, t2, t3 and t4) is 1.5$, 1$, 6$ and 3$, the advertisement slots (s1, s2, s3 and s4) is 1.8$, 8$, 4$ and 7.5$ and the advertisement slots (u1, u2, u3 and u4) is 9$, 10$, 3$ and 1.8$. The advertisement skipping system 106 chooses the advertisement slots t1, t2 and t4 from t1, t2, t3 and t4 as the first amount set by user A (5$) is more than the second amount of slots t1, t2 and t4 and less than the second amount of slot t3. Similarly, the advertisement skipping system 106 chooses the advertisement slots s1 and s3 and the advertisement slots u3 and u4.

Going further, the advertisement skipping system 106 determines a corresponding threshold third pre-determined amount separately for each of the chosen first set of advertisement slots for bidding. The threshold third pre-determined amount is less than the first amount and is based on a second pre-determined criterion. In an embodiment of the present disclosure, the advertisement skipping system 106 sets the threshold third pre-determined amount based on the past bidding history of each of the chosen first set of advertisement slots.

In an embodiment of the present disclosure, the second pre-determined criterion includes calculating the threshold third pre-determined amount based on a mathematical model. Further, the advertisement skipping system 106 sets the threshold third pre-determined amount such that maximum number of advertisement slots in the chosen first set of advertisement slots are skipped. Moreover, the threshold pre-determined amount is set such that the advertisement skipping system 106 doesn't have to pay more than the first amount set by the user 102 for skipping the one or more advertisements. In an embodiment of the present disclosure, the threshold third pre-determined amount is set for a purpose of bidding for winning the maximum number of advertisement slots in the first set of advertisement slots and shouldn't exceed a real time bidding amount (as described below in the patent application).

Continuing with the above stated example, the advertisement skipping system 106 decides a threshold amount of 2$ for slot t1 (past bidding amount of 1.5$), 1.5$ for slot t2 (past bidding amount of 1$) and 5$ for slot t3 (past bidding amount of 3$), a threshold amount of 3$ (past bidding amount of 1.8$) for slot s1 and 6$ for slot s2 (past bidding amount of 4$) and a threshold amount of 4$ (past bidding amount of 3$) for slot u3 and 3$ for slot u4 (past bidding amount of 1.8$).

Furthermore, the advertisement skipping system 106 bids a corresponding fourth pre-determined amount for each of the chosen first set of advertisement slots. In an embodiment of the present disclosure, the advertisement skipping system 106 bids the corresponding fourth pre-determined amount in response to a bidding amount generated for each of the chosen first set of advertisement slots through the real time bidding process. In an embodiment of the present disclosure, the real time bidding process generates the bidding amount corresponding to each of the chosen first set of advertisement slots for which the threshold third pre-determined amount has been determined (as described above in the patent application). Furthermore, the fourth pre-determined amount is an amount greater than the amount had the user 102 opted to view the one or more advertisements in the corresponding one or more advertisement slots. In an embodiment of the present disclosure, the fourth pre-determined amount is greater than the real time bidding amount generated for each of the chosen first set of advertisement slots through the real time bidding process. In addition, the real time bidding process is conducted by the advertisement exchange 204 (as described above in detail in the patent application).

In an embodiment of the present disclosure, the advertisement skipping system 106 bids the fourth pre-determined amount so as to skip the optimum number of the one or more advertisements in the corresponding chosen first set of advertisement slots.

In another embodiment of the present disclosure, the fourth pre-determined amount is less than the threshold third pre-determined amount corresponding to the chosen first set of advertisement slots.

In yet another embodiment of the present disclosure, the advertisement skipping system 106 does not bid for an advertisement slot in the chosen first set of advertisement slots if the fourth pre-determined amount exceeds the threshold third pre-determined amount.

Extending the above stated example, the real time bidding amount of the advertisement slots t1, t2 and t3 is 1.8$, 1.6$ and 4$, the real time bidding amount of the advertisement slots s1 and s3 is 2.2$ and 4.1$ and the real time bidding amount of the advertisement slots u3 and u4 is 3.5$ and 2.5$. Furthermore, the advertisement skipping system 106 bids the fourth pre-determined amount of 1.9$ for slot t1 and 4.1$ for slot t3, bids the fourth pre-determined amount of 2.3$ for slot s1 and 4.4$ for slot s3 and bids the fourth pre-determined amount of 3.8$ for slot u3 and 2.8$ for slot u4. The advertisement skipping system 106 does not bid on the slot t2 as the real time bidding amount of slot t2 (1.6$) exceeds the set threshold amount of 1.5$. The advertisement skipping system 106 skips the advertisements in the slots t1 and t4 in the video of the TV show watched by the user A on his/her laptop, skips the advertisements in the slots s1 and s3 in the movie watched by the user B on his/her television and skips the advertisements in the slots u3 and u4 in the mobile application on the mobile phone used by the user C.

In an embodiment of the present disclosure, the real time bidding amount is based on at least one or compensation methods including cost per click, cost per impression and the like.

In another embodiment of the present disclosure, the advertisement skipping system 106 maintains a database of the user 102 and other one or more users, the first amount, the second amount, the third pre-determined amount, the fourth pre-determined amount and the one or more pre-defined factors.

In yet another embodiment of the present disclosure, the method provides mobile applications with a SDK that supports both ad-supported free or one time paid platforms, thereby allowing the user 102 to watch/skip the advertisements with little amount of money.

In yet another embodiment of the present disclosure, the user 102 configures his/her choices through the account on the advertisement skipping system 106 associated with a television or a set top box via a physical remote.

In yet another embodiment of the present disclosure, the user 102 is provided with a button on the physical remote or in software settings of the set top box for directly skipping the advertisements while watching the content on his/her television set.

In yet another embodiment of the present disclosure, the user 102 can earn credits for watching the advertisement.

In yet another embodiment of the present disclosure, the advertisement skipping system 106 allows the user 102 to redeem the earned credits for skipping the optimum number of the one or more advertisements.

In yet another embodiment of the present disclosure, the user 102 redeems the earned credits for one or more services.

In yet another embodiment of the present disclosure, the user 102 earns the credits during the viewing of the advertisement after an each pre-defined interval. For example, a user Z is viewing an advertisement having a playtime of two minutes. The user Z earns credits after each 20 second intervals (say at 20 sec, 40 sec, and 60 sec). The user Z earns a fraction of the total credits to be earned after the finishing of the advertisement.

In yet another embodiment of the present disclosure, the user 102 earns the credits after watching the entire advertisement.

In yet another embodiment of the present disclosure, one or more devices (mobile and desktop) are equipped with rich media ad formats such as VPAID, MRAID and the like for overlaying an advertisement on top of an underlying advertisement. Further, the one or more users are given a choice to pay for skipping the advertisements or to view the underlying advertisement.

It may be noted that the advertisement exchange 204 facilitates the real time bidding of the one or more advertisement slots between the one or more publishers 202 and the one or more advertisers 206; however those skilled in the art would appreciate that more number of advertisement exchanges facilitate the real time bidding of the one or more advertisement slots. It may also be noted that the advertisement skipping system 106 calculates the pre-defined value for the user 102; however those skilled in the art would appreciate that the advertisement skipping system 106 calculates the pre-defined value for more users.

In an embodiment of the present disclosure, as illustrated in FIG. 2B, the advertisement skipping system 106 is a part of the advertisement exchange 204. In an embodiment of the present disclosure, the advertisement skipping system 106 illustrated in FIG. 2A and FIG. 2B may provide an advertisement skipping service which allows publishers 202, to offer users, such as user 102, an option to skip the optimum number of the one or more advertisements for a fee.

In one embodiment of the present disclosure, the advertisement skipping service provides the user 102 with choice and control, ease of use and a better advertisement viewing experience. The advertisement skipping service allows the user 102 to control his/her ad experience by skipping ads when desired, for a small fee per skip. As a result of not forcing the user 102 to view ads to support the production, licensing and distribution of the content, the advertisement skipping service provides the user 102 with the better advertisement viewing experience. If user 102 wants to skip a particular advertisement, he/she can. And, if user 102 wants to watch it, he/she can.

In order to skip the optimum number of the one or more advertisements, the user 102 must have an account (e.g., a secure digital wallet) with the advertisement skipping service (the advertisement skipping system 106) with a minimum level of funding (e.g., five dollars). In an embodiment of the present disclosure, the advertisement skipping service may accept multiple forms of payment to fund the account, such as electronic transfer (e.g., automated clearing house (ACH) transfer or wire transfer) from a designated bank account, credit card (e.g., Visa, MasterCard, Discover, American Express), online wallet (e.g., PayPal, Amazon Payments and Google Checkout) and/or mobile payment, digital currency and the like.

In an embodiment of the present disclosure, the user 102 may fund his/her secure digital wallet manually or by setting up auto-funding when the account falls below the minimum level of funding. The user 102 may be offered incentives to earn free skips or may be given coupons/discount to earn free skips. Free skips may be earned by user 102 for certain service milestones, e.g., signing up for an account, funding his/her account (e.g., one free skip for each dollar deposited over a minimum threshold), referrals and the like.

In an embodiment of the present disclosure, various tools can be used by a publisher of the one or publishers 202 to credit its advertisers of the one or more advertisers 206. In an embodiment of the present disclosure, the publisher of the one or publishers 202 is provided with access to a dashboard/user interface within the advertisement skipping service. This dashboard allows the publisher of the one or publishers 202 to download a comprehensive report on all advertisements that were skipped within a selectable date period or with any constraints. In an embodiment of the present disclosure, each of the one or more advertisers 206 may be provided with a corresponding dashboard/user interface. This corresponding dashboard/user interface may provide the one or more advertisers 206 with business intelligence reports related to the advertisement skipping services.

The advertisement skipping services not only help the user 102 with a better viewing experience but also allow the one or more publishers 202 to increase their available advertisement inventory. The advertisement skipping service also allows the one or more publishers 202 to make more money by paying publishers 202 high CPMs for skipped advertisements. In addition, the advertisement skipping service enhances relationships between the one or more publishers 202 and the one or more advertisers 206. The one or more advertisers 206 are credited for skipped advertisements, thereby eliminating wasteful ad spending. In addition, by offering consumers a choice, the one or more publishers 202 offer a more engaging advertisement placement to the one or more advertisers 206, which increase the quality and relevancy of publisher's advertisement inventory.

In an embodiment of the present disclosure, the advertisement skipping system 106 facilitates the real time bidding process between the one or more publishers 202 and the one or more advertisers 206.

FIG. 3A illustrates a system 300 for showing an example embodiment for skipping the one or more advertisements at the corresponding one or more advertisement slots in the content, in accordance with various embodiments of the present disclosure. It may be noted that to explain the system elements of FIG. 3A, references will be made to the system elements of FIG. 1, FIG. 2A and FIG. 2B. The system 300 depicts a user 302, one or more advertisements 304 in a content 306 and the advertisement skipping system 106.

The user 302 is associated with a device for watching the content 306. Further, the user 302 provides an input in form of an amount (X USD) for skipping the optimum number of the one or more advertisements 304 in the content 306. The content 306 includes advertisement slots T1, T2, T3, T4 and T5. The one or more advertisements are provided in the slots T1, T2, T3, T4 and T5. The user 302 wants to skip the optimum number of the one or more advertisements in the slots T1, T2, T3, T4 and T5. The advertisement skipping system 106 fetches the real time bidding amounts for the advertisement slots T1, T2, T3, T4 and T5 based on the real time bidding process taken place in the past and produces an output A. The output A corresponds to the real time bidding amounts of the advertisement slots T1, T2, T3, T4 and T5, the amount set by the user 302 (X USD) and the pre-defined value for the user 302.

The advertisement skipping system 106 utilizes the output A for choosing to bid on the slots T1, T2 and T4. Further, the advertisement skipping system 106 determines the threshold amount for bidding on the slots T1, T2 and T4. The threshold amount is less than the amount (X USD) set by the user 302 and is based on the second pre-determined criterion. Moreover, the advertisement skipping system 106 bids the fourth pre-determined amount for the slots T1, T2 and T4 in the content 306. The fourth pre-determined amount is less than the threshold amount and is decided in response to the bidding amount generated for the slots T1, T2 and T4 based on the real time bidding process (as exemplary stated in the detailed description of the FIG. 2A). In addition, the advertisement skipping system 106 wins the bids on T1 and T2 and skips the advertisements in the slots T1 and T2.

It may be noted that the user 302 provides the input in the form of amount for skipping the one or more advertisements; however those skilled in the art would appreciate that more users provide input for skipping the one or more advertisements. It may be noted that the advertisement skipping system 106 may enable skipping of an advertisements based on a model that will calculate the amount to be deducted from the account of the publisher had the chooses to view the advertisement.

In an embodiment of the present disclosure, the advertisement skipping system 106 skips the optimum number of the one or more advertisements based on one or more machine learning algorithms as illustrated in FIG. 3B. It may be noted that to explain the system elements of FIG. 3B, references will be made to the system elements of FIG. 1, FIG. 2A and FIG. 2B and FIG. 3A. The one or more machine learning algorithms may include a first ensemble model 308, a second ensemble model 310, a third ensemble model 312 and a logging service 314. The following models collectively enable the skipping of the optimum number of the one or more advertisements in the content 306.

The first ensemble model 308 predicts remaining number of pre-roll and mid-roll advertisement slots of the one or more advertisement slots in the content 306. Further, the first ensemble model 308 calculates remaining duration of an advertisement from the one or more advertisements in seconds.

Moreover, the first ensemble model 308 is associated with the second ensemble model 310. The second ensemble model 310 utilizes output of the first ensemble model 308 and predicts a probable amount of the remaining pre-roll advertisement slots and maximum bidding amount of the pre-roll advertisement slots in the content 306. In an embodiment of the present disclosure, the second ensemble model 310 utilizes the output of the first ensemble model 308 to minimize linear/non-linear score S while utilizing the budget threshold without exceeding it.

Going further, the second ensemble model 310 is associated with the third ensemble model 312. The third ensemble model 312 utilizes the output of the first ensemble model 308, output of the second ensemble model 310 and remaining portion of the budget threshold and predicts a probable amount of the current mid-roll advertisement slot and maximum bidding amount of the mid-roll advertisement slot in the content 306. In an embodiment of the present disclosure, the third ensemble model 312 utilizes the output of the first ensemble model 308, the output of the second ensemble model 310 and the remaining portion of the budget threshold to minimize the linear/non-linear score S while utilizing the budget threshold without exceeding it.

In an embodiment of the present disclosure, the first ensemble model 308, the second ensemble model 310 and the third ensemble model 312 are run several times for re-calibration. In another embodiment of the present disclosure, the third ensemble model 312 runs multiple times for each of the mid-roll advertisement slots even for the same content.

In yet another embodiment of the present disclosure, the second ensemble model 310 and the third ensemble model 312 take into account future associated with the content 306. For example, a user X watches a video of a show of 30 minutes on his/her television having a run time of 22 minutes without advertisements. The video includes mid-roll advertisement slots t1, t2, t3 and t4. The show starts at 9.30 pm and it is currently 9.50 pm. The second ensemble model 310 and the third ensemble model 312 may calculate a lower bidding amount for the slots t3 and t4 as compared to the slots t1 and t2 appearing at an earlier time in the video. The bidding algorithm set by the one or more advertisers 206 opposes to bid on the slots t3 and t4 and results in winning of a lower bid.

In yet another embodiment of the present disclosure, the first ensemble model 308, the second ensemble model 310 and the third ensemble model 312 may include online learning models and a feedback system for modifying the online learning models in real time or collects it for updating of offline models on a regular basis.

In yet another embodiment of the present disclosure, the first ensemble model 308, the second ensemble model 310 and the third ensemble model 312 may include a rules engine.

In yet another embodiment of the present disclosure, the third ensemble model 312 may include several machine learning/rules engine components along with a gating network model.

In yet another embodiment of the present disclosure, the third ensemble model 312 may be a single one of machine learning model combined with the rules engine.

For example, the budget scope is four videos. A user Y is watching second video content from the four videos. The first amount set by the user Y is $1.00 and the budget threshold allowed is twenty percent more than the set first amount ($1.20). The second video content includes five predicted advertisement slots s1, s2, s3, s4 and s5. The user Y watches the advertisement on the advertisement slot s3. The user Y spends a budget of spent $0.06 and $0.07 for the slots s1 and s2. Further, the user Y spent a total budget of $0.32 on the first video from the four videos. The machine learning models calculates the remaining budget ($1.00–$0.32–$0.06–$0.07=$0.55) and the budget threshold ($0.75).

In an embodiment of the present disclosure, the advertisement skipping system 106 utilizes the output of the first ensemble model 308, the second ensemble model 310 and the third ensemble model 312 to calculate F1 (as described below in the patent application).

In another embodiment of the present disclosure, the third ensemble model 312 utilize the calculated F1 to estimate a probable amount to be spent and a maximum bidding amount for a current advertisement slot of the one or more advertisement slots.

In yet another embodiment of the present disclosure, the machine learning algorithms provide confidence scores.

In yet another embodiment of the present disclosure, the feedback system sends a copy of the bid win/loss data to the advertisement skipping system 106.

In yet another embodiment of the present disclosure, the first ensemble model 308, the second ensemble model 310 and the third ensemble model 312 may be scheduled to run ahead of time in order to generate desired results in a fixed interval of time.

In yet another embodiment of the present disclosure, the advertisement skipping system 106 may employ another machine learning model for skipping the optimum number of the one or more advertisements in the content. The content may be a queue of content. Further, the queue of content may be a combination of one or more user requested content. Moreover, the system 300 may include one or more items. In addition, the one or more items may include a budget and a budget scope (B), a time (T) for playing the content (current vs. date/time), a channel (C) (cbs.com, hulu.com, DVR, amazon prime rental/purchased content and the like) and a device (D) (mobile, Roku, iPad, desktop and the like).

In yet another embodiment of the present disclosure, the advertisement skipping system 106 minimizes a scoring function F1.

F1=Func1(Cost|close to Budget Threshold when available without exceeding it, F0)

where

F0=Func2(Ad durations, # of pre-roll, # of mid-roll)

In yet another embodiment of the present disclosure, each of the functions Func1 and Func2 may be linear or non-linear and may include fewer or additional parameters. The function F1 may be illustrated as $$F1 = (Cost*a0+c0)/(duration*a1 + NumPreRollAds*a2 + NumMidRollAds*a3 + c1)$$

where a0, c0, a1, a2, a3, c1 are all parameters whose value will be determined as part of the process.

In yet another embodiment of the present disclosure, the advertisement skipping system 106 minimizes value of the function F1 by utilizing the budget and the budget scope, predicting an ideal time to start the content, deciding the channel to watch the content on and the device to view the content.

In yet another embodiment of the present disclosure, the one or more items may be utilized in one or more combinations for minimizing the value of the function F1. The one or more combinations are illustrated below.

1. B|TCD: Given B, predict/estimate TCD such that we minimize F1.
2. T|BCD: Given T, predict/estimate BCD such that we minimize F1.
3. C|BTD: Given C, predict/estimate BTD such that we minimize F1.
4. D|BTC: Given D, predict/estimate BTC such that we minimize F1.
5. BT|CD: Given BT, predict/estimate CD such that we minimize F1.
6. BC|TD: Given BC, predict/estimate TD such that we minimize F1.
7. BD|TC: Given BD, predict/estimate TC such that we minimize F1.
8. TC|BD: Given TC, predict/estimate BD such that we minimize F1.
9. TD|BC: Given TD, predict/estimate BC such that we minimize F1.
10. CD|BT: Given CD, predict/estimate BT such that we minimize F1.
11. TCD|B: Given TCD, predict/estimate B such that we minimize F1.
12. BCD|T: Given BCD, predict/estimate T such that we minimize F1.
13. BTD|C: Given BTD, predict/estimate C such that we minimize F1.
14. BTC|D: Given BTC, predict/estimate D such that we minimize F1.
15. BTCD: Given BTCD, minimize F1.
16. B|: Given B, minimize F1

FIG. 4 illustrates a block diagram 400 of a communication device 402, in accordance with various embodiments of the present disclosure. The communication device 402 includes a processor 404, a control circuitry module 406, a storage module 408, an input/output circuitry module 410 and a communication circuitry module 412. Further, the processor 404 includes a receiving module 404a, a selection module 404b, a determination module 404c, a bidding engine 404d and a database 404e. The above stated components of the processor 404 enables the working of the advertisement skipping system 106 for performing the skipping of the one or more advertisements in the corresponding one or more advertisement slots in the content viewed by the user 102.

The receiving module 404a receives the first amount from the user 102 for skipping the one or more advertisements in the corresponding one or more advertisement slots in the content. In an embodiment of the present disclosure, the user 102 sets the amount (the first amount) for skipping the optimum number of the one or more advertisements in the corresponding one or more advertisement slots. The selection module 404b chooses the first set of advertisement slots from the one or more advertisement slots. Further, the choosing of the first set of advertisement slots from the one or more advertisement slots is based on the second amount, the received first amount and the first pre-defined criterion.

The determination module 404c determines the corresponding threshold third pre-determined amount separately for each of the chosen first set of advertisement slots for bidding. The threshold third pre-determined amount is less than the first amount and is based on the second pre-determined criterion. In an embodiment of the present disclosure, the advertisement skipping system 106 sets the threshold third pre-determined amount based on the past bidding history of each of the chosen first set of advertisement slots.

The bidding module 404d bids the corresponding fourth pre-determined amount for each of the chosen first set of advertisement slots. In an embodiment of the present disclosure, the advertisement skipping system 106 bids the corresponding fourth pre-determined amount based on the real time bidding process. The database 404e maintains information of the user 102 and the other one or more users, the first amount, the second amount, the third pre-determined amount, the fourth pre-determined amount and the one or more pre-defined factors.

Going further, the communication device 402 includes any suitable type of portable electronic device. Examples of the communication device 402 include but may not be limited to a high end laptop computer, a tablet computer, desktop computer, and a server having computational capabilities.

From the perspective of this disclosure, the control circuitry module 406 includes any processing circuitry or processor operative to control the operations and performance of the communication device 402. For example, the control circuitry module 406 may be used to run operating system applications, firmware applications, media playback applications, media editing applications, or any other application. In an embodiment, the control circuitry module 406 drives a display and process inputs received from a user interface.

From the perspective of this disclosure, the storage module 408 includes one or more storage mediums including a hard-drive, solid state drive, flash memory, permanent memory such as ROM, any other suitable type of storage component, or any combination thereof. The storage module 408 may store, for example, media data (e.g., music and video files), application data (e.g., for implementing functions on the communication device 402).

From the perspective of this disclosure, the I/O circuitry module 410 may be operative to convert (and encode/decode, if necessary) analog signals and other signals into digital data. In an embodiment, the I/O circuitry module 410 may also convert the digital data into any other type of signal and vice-versa. For example, the I/O circuitry module 410 may receive and convert physical contact inputs (e.g., from a multi-touch screen), physical movements (e.g., from a mouse or sensor), analog audio signals (e.g., from a microphone), or any other input. The digital data may be provided to and received from the control circuitry module 406, the storage module 408 or any other component of the communication device 402.

It may be noted that the I/O circuitry module 410 is illustrated in FIG. 4 as a single component of the communication device 402; however those skilled in the art would appreciate that several instances of the I/O circuitry module 410 may be included in the communication device 402.

The communication device 402 may include any suitable interface or component for allowing the user 102 to provide inputs to the I/O circuitry module 410. The communication device 402 may include any suitable input mechanism. Examples of the input mechanism include but may not be limited to a button, keypad, dial, a click wheel, and a touch screen. In an embodiment, the communication device 402 may include a capacitive sensing mechanism, or a multi-touch capacitive sensing mechanism.

In an embodiment, the communication device 402 may include specialized output circuitry associated with output devices such as, for example, one or more audio outputs. The audio output may include one or more speakers built into the communication device 402, or an audio component that may be remotely coupled to the communication device 402.

The one or more speakers can be mono speakers, stereo speakers, or a combination of both. The audio component can be a headset, headphones or ear buds that may be coupled to the communication device 402 with a wire or wirelessly.

In an embodiment, the I/O circuitry module 410 may include display circuitry for providing a display visible to the user 102. For example, the display circuitry may include a screen (e.g., an LCD screen) that is incorporated in the communication device 402.

The display circuitry may include a movable display or a projecting system for providing a display of content on a surface remote from the communication device 402 (e.g., a video projector). In an embodiment, the display circuitry may include a coder/decoder to convert digital media data into the analog signals. For example, the display circuitry may include video Codecs, audio Codecs, or any other suitable type of Codec.

The display circuitry may include display driver circuitry, circuitry for driving display drivers or both. The display circuitry may be operative to display content. The display content can include media playback information, application screens for applications implemented on the electronic device, information regarding ongoing communications operations, information regarding incoming communications requests, or device operation screens under the direction of the control circuitry module 406. Alternatively, the display circuitry may be operative to provide instructions to a remote display.

In addition, the communication device 402 includes the communication circuitry module 412. The communication circuitry module 412 may include any suitable communication circuitry operative to connect to a communication network and to transmit communications (e.g., voice or data) from the communication device 402 to other devices within the communications network. The communication circuitry module 412 may be operative to interface with the communication network using any suitable communication protocol. Examples of the communication protocol include but may not be limited to Wi-Fi, Bluetooth®, radio frequency systems, infrared, LTE, GSM, GSM plus EDGE, CDMA, and quadband.

In an embodiment, the communication circuitry module 412 may be operative to create a communications network using any suitable communications protocol. For example, the communication circuitry module 412 may create a short-range communication network using a short-range communications protocol to connect to other devices. For example, the communication circuitry module 412 may be operative to create a local communication network using the Bluetooth,® protocol to couple the communication device 402 with a Bluetooth,® headset.

It may be noted that the computing device is shown to have only one communication operation; however, those skilled in the art would appreciate that the communication device 402 may include one more instances of the communication circuitry module 412 for simultaneously performing several communication operations using different communication networks. For example, the communication device 402 may include a first instance of the communication circuitry module 412 for communicating over a cellular network, and a second instance of the communication circuitry module 412 for communicating over Wi-Fi or using Bluetooth®.

In an embodiment, the same instance of the communication circuitry module 412 may be operative to provide for communications over several communication networks. In an embodiment, the communication device 402 may be coupled a host device for data transfers, synching the communication device 402, software or firmware updates, providing performance information to a remote source (e.g., providing riding characteristics to a remote server) or performing any other suitable operation that may require the communication device 402 to be coupled to a host device. Several computing devices may be coupled to a single host device using the host device as a server. Alternatively or additionally, the communication device 402 may be coupled to the several host devices (e.g., for each of the plurality of the host devices to serve as a backup for data stored in the communication device 402).

It may be noted that in FIG. 4, various modules of the advertisement skipping system 106 are shown that illustrates the working of the advertisement skipping system 106; however those skilled in the art would appreciate that the advertisement skipping system 106 may have more number of modules that could illustrate overall functioning of the advertisement skipping system 106.

FIG. 5 illustrates a flowchart 500 for skipping the one or more advertisements in the corresponding one or more advertisement slots in the content, in accordance with various embodiments of the present disclosure. It may be noted that to explain the process steps of FIG. 5, references will be made to the system elements of the FIG. 1, FIG. 2A, FIG. 2B, FIG. 3A, FIG. 3B and FIG. 4. The flow chart 500 initiates at step 502. Following step 502, at step 504, the receiving module 404a receives the first amount from the user 102. At step 506, the selection module 404b chooses the first set of advertisement slots of the one or more advertisement slots. At step 508, the determination module 404c determines the corresponding threshold third pre-determined amount separately for each of the first set of advertisement slots for bidding. At step 510, the bidding engine 404d bids the corresponding fourth pre-determined amount for each of the first set of advertisement slots. The flowchart terminates at step 512.

It may be noted that the flowchart 500 is explained to have above stated process steps; however, those skilled in the art would appreciate that the flowchart 500 may have more/less number of process steps which may enable all the above stated embodiments of the present disclosure.

What is claimed is:

1. A computer-implemented method for skipping one or more advertisements at a corresponding one or more advertisement slots in a content viewed by a user of one or more users, the computer-implemented method comprising:

receiving, at an advertisement skipping system with a processor, a first amount from said user, wherein said first amount being set for skipping said one or more advertisements at corresponding said one or more advertisement slots;

choosing, at said advertisement skipping system with said processor, a first set of advertisement slots of said one or more advertisement slots, wherein said choosing being based on a second amount for each of said one or more advertisement slots, said first amount and a first pre-defined criterion, wherein said second amount being an amount decided through a real time bidding process for said one or more advertisement slots and wherein said second amount for said chosen first set of advertisement slots being less than said first amount set by said user;

determining, at said advertisement skipping system with said processor, a corresponding threshold third pre-determined amount separately for each of said first set of advertisement slots for bidding, wherein said third pre-determined amount being less than said first amount and being based on a second pre-determined criterion and wherein said threshold third pre-determined amount being determined based on a past bidding history of each of said chosen first set of advertisement slots and wherein said second pre-determined criterion being based on a predicted number of remaining pre-roll advertisement slots in said content, a maximum bidding amount for said predicted number of remaining pre-roll advertisement slots, a predicted number of mid-roll advertisement slots in said content, a maximum bidding amount for said predicted number of remaining mid-roll advertisement slots and a budget threshold associated with said user and wherein said maximum bidding amount for said remaining number of pre-roll advertisement slots and said maximum bidding amount for said remaining number of mid-roll advertisement slots being based on said budget threshold; and bidding, at said advertisement skipping system with said processor, a corresponding fourth pre-determined amount for each of said first set of advertisement slots, wherein said fourth pre-determined amount being set based on said threshold third pre-determined amount for said first set of advertisement slots, wherein said corresponding fourth pre-determined amount for each of the first set of advertisement slots being an amount greater than amount if the user opted for viewing said one or more advertisements in corresponding said one or more advertisement slots and wherein said corresponding fourth pre-determined amount being less than said corresponding threshold third pre-determined amount and wherein said fourth pre-determined amount being greater than a real time bidding amount for said chosen first set of advertisement slots.

2. The computer-implemented method as recited in claim 1, wherein said first pre-defined criterion comprises a pre-defined value, wherein said pre-defined value being calculated based on one or more pre-defined factors.

3. The computer-implemented method as recited in claim 1, wherein said bidding of corresponding said fourth pre-determined amount being based on a real time bidding auction, said threshold third pre-determined amount and said budget threshold.

4. The computer-implemented method as recited in claim 1, wherein said second amount corresponds to bidding history of said one or more advertisement slots.

5. The computer-implemented method as recited in claim 1, further comprising maintaining information of said one or more users, said first amount, said second amount, said third pre-determined amount, said fourth pre-determined amount and said one or more pre-defined factors.

6. The computer-implemented method as recited in claim 1, wherein said content comprises at least one of online and offline content, text content, flash content and HTML content.

7. The computer-implemented method as recited in claim 2, wherein said one or more pre-defined factors comprises at least one of interaction of said user with said one or more advertisements, advertisement skipping history of said user, total remaining budget of said user, mindset of said user, budget refill policy, frequency of repetitive advertisements, frequency of undesirable advertisements, budget spent history and time spent in a session and said budget threshold set by said user.

8. A computer program product comprising a non-transitory computer readable medium storing a computer readable program, wherein said computer readable program when executed on a computer causes said computer to perform steps comprising:

receiving at a communication device, a first amount from a user, wherein said first amount being set for skipping one or more advertisements at corresponding one or more advertisement slots in a content;

choosing at said communication device, a first set of advertisement slots of said one or more advertisement slots, wherein said choosing being based on a second amount for each of said one or more advertisement slots, said first amount and a first pre-defined criterion, wherein said second amount being an amount decided through a real time bidding process for said one or more advertisement slots and wherein said second amount for said chosen first set of advertisement slots being less than said first amount set by said user;

determining at said communication device, a corresponding threshold third pre-determined amount separately for each of said first set of advertisement slots for bidding, wherein said third pre-determined amount being less than said first amount and being based on a second pre-determined criterion, wherein said threshold third pre-determined amount being determined based on a past bidding history of each of said chosen first set of advertisement slots and wherein said second pre-determined criterion being based on a predicted number of remaining pre-roll advertisement slots in said content, a maximum bidding amount for said predicted number of remaining pre-roll advertisement slots, a predicted number of mid-roll advertisement slots in said content, a maximum bidding amount for said predicted number of remaining mid-roll advertisement slots and a budget threshold associated with said user and wherein said maximum bidding amount for said remaining number of pre-roll advertisement slots and said maximum bidding amount for said remaining number of mid-roll advertisement slots being based on said budget threshold; and bidding at said communication device, a corresponding fourth pre-determined amount for each of said first set of advertisement slots, wherein said fourth pre-determined amount being set based on said threshold third pre-determined amount for said first set of advertisement slots, wherein said corresponding fourth pre-determined amount for each of the first set of advertisement slots being an amount greater than the amount if the user opted for viewing said one or more advertisements in corresponding said one or more advertisement slots and wherein said corresponding fourth pre-determined amount being less than said corresponding threshold third pre-determined amount and wherein said fourth pre-determined amount being greater than a real time bidding amount for said chosen first set of advertisement slots.

9. The computer program product as recited in claim 8, wherein said first pre-defined criterion comprises a pre-defined value, wherein said pre-defined value being calculated based on one or more pre-defined factors.

10. The computer program product as recited in claim 8, wherein said bidding of corresponding said fourth pre-determined amount being based on a real time bidding auction, said threshold third pre-determined amount and said budget threshold.

11. The computer program product as recited in claim 8, wherein said second amount corresponds to bidding history of said one or more advertisement slots.

12. The computer program product as recited in claim 8, wherein said computer readable program when executed on said computer causes said computer to perform a step of maintaining information of said one or more users, said first amount, said second amount, said third pre-determined amount, said fourth pre-determined amount and said one or more pre-defined factors.

13. The computer program product as recited in claim 9, wherein said one or more pre-defined factors comprises at least one of interaction of said user with said one or more advertisements, advertisement skipping history of said user, total remaining budget of said user, mindset of said user, budget refill policy, frequency of repetitive advertisements, frequency of undesirable advertisements, budget spent history and time spent in a session and said budget threshold set by said user.

14. An advertisement skipping system for skipping one or more advertisements at a corresponding one or more advertisement slots in a content viewed by a user of one or more users, the advertisement skipping system comprising:
- a receiving module in a processor of said advertisement skipping system being configured to receive a first amount from said user, wherein said first amount being set for skipping said one or more advertisements at corresponding said one or more advertisement slots;
- a selection module in said processor of said advertisement skipping system being configured to choose a first set of advertisement slots of said one or more advertisement slots, wherein said choosing being based on a second amount for each of said one or more advertisement slots, a first amount and a first pre-defined criterion, wherein said second amount being an amount decided through a real time bidding process for said one or more advertisement slots and wherein said second amount for said chosen first set of advertisement slots being less than said first amount set by said user;
- a determination module in said processor of said advertisement skipping system being configured to determine a corresponding threshold third pre-determined amount separately for each of said first set of advertisement slots for bidding, wherein said third pre-determined amount being less than said first amount and being based on a second pre-determined criterion, wherein said threshold third pre-determined amount being determined based on a past bidding history of each of said chosen first set of advertisement slots and wherein said second pre-determined criterion being based on a predicted number of remaining pre-roll advertisement slots in said content, a maximum bidding amount for said predicted number of remaining pre-roll advertisement slots, a predicted number of mid-roll advertisement slots in said content, a maximum bidding amount for said predicted number of remaining mid-roll advertisement slots and a budget threshold associated with said user and wherein said maximum bidding amount for said remaining number of pre-roll advertisement slots and said maximum bidding amount for said remaining number of mid-roll advertisement slots being based on said budget threshold; and
- a bidding engine in said processor of said advertisement skipping system being configured to bid a corresponding fourth pre-determined amount for each of said first set of advertisement slots, wherein said fourth pre-determined amount being set based on said threshold third pre-determined amount for said first set of advertisement slots, wherein said corresponding fourth pre-determined amount for each of the first set of advertisement slots being an amount greater than the amount if the user opted for viewing said one or more advertisements in corresponding said one or more advertisement slots and wherein said corresponding fourth pre-determined amount being less than said corresponding threshold third pre-determined amount and wherein said fourth pre-determined amount being greater than a real time bidding amount for said chosen first set of advertisement slots.

15. The advertisement skipping system as recited in claim 14, wherein said first pre-defined criterion comprises a pre-defined value, wherein said pre-defined value being calculated based on one or more pre-defined factors.

16. The advertisement skipping system as recited in claim 14, wherein said bidding of corresponding said fourth pre-determined amount being based on a real time bidding auction, said threshold third pre-determined amount and said budget threshold.

17. The advertisement skipping system as recited in claim 14, wherein said second amount corresponds to bidding history of said one or more advertisement slots.

18. The advertisement skipping system as recited in claim 14, further comprising a database in said processor of said advertisement skipping system being configured to maintain information of said one or more users, said first amount, said second amount, said third pre-determined amount, said fourth pre-determined amount and said one or more pre-defined factors.

19. The advertisement skipping system as recited in claim 14, wherein said content comprises at least one of online and offline content, text content, flash content and HTML content.

20. The advertisement skipping system as recited in claim 15, wherein said one or more pre-defined factors comprises at least one of interaction of said user with said one or more advertisements, advertisement skipping history of said user, total remaining budget of said user, mindset of said user, budget refill policy, frequency of repetitive advertisements, frequency of undesirable advertisements, budget spent history and time spent in a session and said budget threshold set by said user.

* * * * *